(12) United States Patent
Fujimura et al.

(10) Patent No.: US 8,445,618 B2
(45) Date of Patent: May 21, 2013

(54) HIGHLY CRYSTALLINE HIGHER α-OLEFIN POLYMER AND PROCESS FOR PRODUCTION THEREOF

(75) Inventors: Takenori Fujimura, Chiba (JP); Masami Kanamaru, Chiba (JP); Takuji Okamoto, Chiba (JP); Yutaka Minami, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 811 days.

(21) Appl. No.: 12/094,692

(22) PCT Filed: Nov. 29, 2006

(86) PCT No.: PCT/JP2006/323789
§ 371 (c)(1),
(2), (4) Date: May 22, 2008

(87) PCT Pub. No.: WO2007/063885
PCT Pub. Date: Jun. 7, 2007

(65) Prior Publication Data
US 2009/0240016 A1    Sep. 24, 2009

(30) Foreign Application Priority Data
Nov. 30, 2005    (JP) ................................. 2005-346103

(51) Int. Cl.
*C08F 210/00* (2006.01)
*C08F 10/14* (2006.01)

(52) U.S. Cl.
USPC ....................................... 526/348; 526/348.3

(58) Field of Classification Search
USPC ....................................................... 526/348
See application file for complete search history.

(56) References Cited

U.S. PATENT DOCUMENTS

2005/0049373 A1 * 3/2005 Minami et al. ................ 526/160

FOREIGN PATENT DOCUMENTS

| EP | 0 627 449 | 12/1994 |
|---|---|---|
| JP | 60 106884 | 6/1985 |
| JP | 7 145205 | 6/1995 |
| JP | 2005 75908 | 3/2005 |
| WO | 2003 070790 | 8/2003 |

OTHER PUBLICATIONS

U.S. Appl. No. 12/526,978, filed Aug. 13, 2009, Fujimura, et al.

\* cited by examiner

*Primary Examiner* — Hui Chin
(74) *Attorney, Agent, or Firm* — Oblon, Spivak, McClelland, Maier & Neustadt, L.L.P.

(57) ABSTRACT

A highly crystalline higher α-olefin polymer that is excellent in compatibility with a thermoplastic resin, particularly a polyolefin, compatibility with a lubricant oil, a fuel oil and wax, mixing property with an inorganic filler, and secondary working property, and a process for production thereof are provided. The highly crystalline higher α-olefin polymer is obtained by polymerizing a monomer containing 80% by mol or more of a higher α-olefin having from 22 to 40 carbon atoms, and satisfies the following items (1) and (2). (1) The melting point (Tm), which is observed, by using a differential scanning calorimeter (DSC), from a melting endothermic curve obtained by maintaining a specimen at 190° C. for 5 minutes under a nitrogen atmosphere, cooling the specimen to −10° C. at a rate of 5° C./min, maintaining at −10° C. for 5 minutes, and then elevating a temperature thereof to 190° C. at a rate of 10° C./min, is from 55 to 100° C. (2) Standards weight average molecular weight (Mw) measured by a gel permeation chromatography (GPC) based on polystyrene is from 1,000 to 5,000,000, and the molecular weight distribution (Mw/Mn) measured thereby is 5.0 or less.

20 Claims, No Drawings

HIGHLY CRYSTALLINE HIGHER α-OLEFIN POLYMER AND PROCESS FOR PRODUCTION THEREOF

TECHNICAL FIELD

The present invention relates to a highly crystalline higher α-olefin polymer that is useful for such purposes as a releasing agent for a toner, a component for ink, a modifier for a resin, a component for a tackiness agent, a component for an adhesive, a component of a lubricant oil, an organic or inorganic composite material, a heat storage material, a modifier for a fuel oil, such as a light fuel oil, a modifier for asphalt, high performance wax and the like, and a process for production thereof.

BACKGROUND ART

Polymerization of a higher α-olefin having 10 or more carbon atoms has been studied, and mainly the use of a Ziegler-Natta catalyst has been studied (as described, for example, in Patent Document 1, Non-patent Document 1, Non-patent Document 2 and Non-patent Document 3). It has been noted however that the higher α-olefin polymers obtained in these literatures have a low molecular weight in some cases, have a high melting point due to high regularity, and are inhomogeneous to exhibit two melting points.

Furthermore, a higher α-olefin polymer can be obtained with a homogeneous catalyst system, which is referred to as a metallocene catalyst (as described, for example, in Non-patent Document 4, Non-patent Document 5, Non-patent Document 6 and Non-patent Document 7). However, the polymer does not have a sufficiently high molecular weight, have a high melting point due to high regularity, and are inhomogeneous to exhibit two melting points, as similar to the polymer obtained with the heterogeneous catalyst.

The presence of plural melting points indicates inhomogeneity in size of crystals or the like, which may bring about tackiness.

In the case where the higher α-olefin polymer is used as a modifier mixed with other materials, they may not be mixed homogeneously to fail to provide modified properties intended.

Moreover, in the case where the higher α-olefin polymer is used as such purposes as a heat storage material, it is demanded from the standpoint of improvement in efficiency of the heat storage material that the material exhibits rapid dissipation and absorption of heat owing to rapid melting or crystallization at a particular temperature. However, the higher α-olefin polymer is difficult to undergo the aforementioned phenomenon at the particular temperature due to the inhomogeneity thereof.

A toner is constituted by plural raw materials, and wax as a toner component is ordinarily used as a releasing agent. The releasing agent has a function of facilitating release of the toner from a photoreceptor drum or a fixing device. Examples of wax used as the releasing agent include carnauba wax, an esterified reaction product thereof, low molecular weight polypropylene and the like. It is demanded that the wax is not melted at the assumed temperature of the external environment and does not impair charging of the toner, for functioning as a releasing agent and maintaining the printing quality.

Examples of the properties that is demanded for the wax include a melting point of from 50 to 80° C., a sharp melting and solidifying behavior, appropriate compatibility with the other components constituting the toner, and the like. Wax derived from natural materials, such as carnauba wax, contains various kinds of components in a mixed state and thus has such problems that it does not have a sharp melting and solidifying behavior and is not stable in quality. Furthermore, in the field of a polymerizable toner, solubility to wax is also demanded. The sharp melting and solidifying behavior referred herein means such a behavior in that 80% or more of the total peak area is contained in the range of 10° C. in total from the temperature 7° C. lower than the maximum peak temperature to the temperature 3° C. higher than the maximum peak temperature.

Patent Document 1: Japanese Patent Application Laid-Open (kokai) No. 7-145205
Non-patent Document 1: Polymer J., 10, 619 (1978)
Non-patent Document 2: Macromol. Chem., 190, 2683 (1989)
Non-patent Document 3: Macromol. Chem., Rapid Comm., 13, 447 (1992)
Non-patent Document 4: Macromol. Sci. Pure Appl. Chem., A35, 473 (1998)
Non-patent Document 5: J. Polym. Sci. A, 38, 233 (2000)
Non-patent Document 6: Macromol. Mater. Eng., 286, 350 (2001)
Non-patent Document 7: Macromol. Mater. Eng., 286, 480 (2001)

DISCLOSURE OF THE INVENTION

Problems to be Solved by the Invention

The present invention has been made under the circumstances, and an object thereof is to provide such a highly crystalline higher α-olefin polymer that is excellent in compatibility with a thermoplastic resin, particularly a polyolefin, compatibility with a lubricant oil, a fuel oil and wax, mixing property with an inorganic filler, and secondary working property, and has a narrow temperature range of melting and crystallization, and a process for production thereof.

Means for Solving the Problems

As a result of earnest investigations made by the inventor for attaining the object, it has been found that a highly crystalline higher α-olefin polymer having a particular nature and being obtained by polymerizing a monomer containing 80% by mol or more of a higher α-olefin having from 22 to 40 carbon atoms attains the object, and the polymer can be produced by using a particular metallocene catalyst. Commercially available ordinary wax is poor in solubility with an aliphatic hydrocarbon solvent and an aromatic hydrocarbon solvent, but it has been found that the highly crystalline higher α-olefin polymer has good solubility with the solvents. The present invention has been completed based on the findings.

The present invention provides a highly crystalline higher α-olefin polymer and a process for production thereof shown below.

1. A highly crystalline higher α-olefin polymer obtained by polymerizing a monomer containing 80% by mol or more of a higher α-olefin having from 22 to 40 carbon atoms, and the polymer satisfying the following items (1) and (2):
(1) the melting point (Tm), which is observed, by using a differential scanning calorimeter (DSC), from a melting endothermic curve obtained by maintaining a specimen at 190° C. for 5 minutes under a nitrogen atmosphere, cooling the specimen to −10° C. at a rate of 5° C./min, maintaining at −10° C. for 5 minutes, and then elevating a temperature thereof to 190° C. at a rate of 10° C./min, is from 55 to 100° C., and (2) Standards weight average molecular weight (Mw) measured by a gel permeation chromatography (GPC) based on polystyrene is from 1,000 to 5,000,000, and the molecular weight distribution (Mw/Mn) measured thereby is 5.0 or less.

2. The highly crystalline higher α-olefin polymer according to the item 1, wherein the polymer further satisfies the following items (3) and (4):

(3) the stereoregularity index M2 derived from a chain of the higher α-olefin having from 22 to 40 carbon atoms is 50% by mol or more, and (4) a single peak X1 is observed that is derived from crystallization of a side chain observed at 15 deg<2θ<30 deg in a wide angle X-ray scattering intensity distribution.

3. A process for production of the highly crystalline higher α-olefin polymer according to the item 1, the process comprising a step of polymerizing a monomer containing 80% by mol or more of a higher α-olefin having from 22 to 40 carbon atoms in a homogeneous liquid state in the presence of a polymerization catalyst comprising (A) a double-crosslinked transition metal compound and (B) at least one component selected from (B-1) a compound capable of forming an ionic complex through reaction with the transition metal compound as the component (A) or a derivative thereof and (B-2) an aluminoxane.

4. A process for production of the highly crystalline higher α-olefin polymer according to the item 1, the process comprising a step of polymerizing a monomer containing 80% by mol or more of a higher α-olefin having from 22 to 40 carbon atoms in a homogeneous liquid state in the presence of a preliminary polymerization catalyst comprising a polymerization catalyst comprising (A) a double-crosslinked transition metal compound, (B) at least one component selected from (B-1) a compound capable of forming an ionic complex through reaction with the transition metal compound as the component (A) or a derivative thereof and (B-2) an aluminoxane, and (C) an organoaluminum compound, having been made in contact with an α-olefin having from 3 to 18 carbon atoms in advance.

5. The process for production of a highly crystalline higher α-olefin polymer according to the item 3 or 4, wherein the monomer containing 80% by mol or more of a higher α-olefin having from 22 to 40 carbon atoms is a monomer obtained by dissolving a mixture of higher α-olefins having 18 or more carbon atoms in a hydrocarbon solvent at a temperature of 50° C. or less and then extracting a homogeneous supernatant solution.

6. The process for production of a highly crystalline higher α-olefin polymer according to one of the items 3 to 5, wherein a polymer is crystallized and deposited at a temperature equal to or lower than the polymerization temperature from a solution containing a polymer obtained by polymerizing the monomer containing 80% by mol or more of a higher α-olefin having from 22 to 40 carbon atoms in a homogeneous liquid state, filtered and rinsed.

7. A highly crystalline higher α-olefin polymer obtained by the process of production according to the item 6.

8. The highly crystalline higher α-olefin polymer according to the item 1, 2 or 7, wherein the polymer is for a releasing agent for a toner, a component for ink, a modifier for a resin, a component for a tackiness agent, a component for an adhesive, a component of a lubricant oil, an organic or inorganic composite material, a heat storage material, a modifier for a fuel oil, a modifier for asphalt, or high performance wax.

Advantages of the Invention

The highly crystalline higher α-olefin polymer of the present invention is excellent in compatibility with a thermoplastic resin, particularly a polyolefin, compatibility with a lubricant oil, a fuel oil and wax, mixing property with an inorganic filler, and secondary working property, and has a narrow temperature range of melting and crystallization.

BEST MODE FOR CARRYING OUT THE INVENTION

The highly crystalline higher α-olefin polymer of the present invention is obtained by polymerizing a monomer containing 80% by mol or more of a higher α-olefin having from 22 to 40 carbon atoms. The other components than the higher α-olefin having from 22 to 40 carbon atoms in the monomer are mainly a higher α-olefin having 21 or less carbon atoms and a higher α-olefin having 41 or more carbon atoms. The content of the higher α-olefin having from 22 to 40 carbon atoms in the monomer is preferably from 85 to 100% by mol, and more preferably from 90 to 100% by mol. In the case where the higher α-olefin used for polymerization has 40 or less carbon atoms, it is soluble in a solvent and other monomers upon polymerization, and polymerization proceeds in a homogeneous solution state.

In the case where the content of a higher α-olefin having less than 22 carbon atoms is 80% by mol or more, the resulting higher α-olefin polymer has a too low melting point, which lowers the heat resistance, and in the case where the content of a higher α-olefin having more than 40 carbon atoms is 80% by mol or more, the polymerization activity is lowered due to a large content of a wax component, and the higher α-olefin polymer has a wide melting point range.

Examples of the monomer containing 80% by mol or more of a higher α-olefin having from 22 to 40 carbon atoms include Linearene 26+ (a trade name, produced by Idemitsu Kosan Co., Ltd., a mixture mainly of α-olefins having 26 or more carbon atoms) and the like. In the present invention, such a monomer containing 80% by mol or more of a higher α-olefin having from 22 to 40 carbon atoms may also be used that is obtained by dissolving a mixture of higher α-olefins having 18 or more carbon atoms in a hydrocarbon solvent at a temperature of 50° C. or less, and preferably from 15 to 5° C., and then extracting a homogeneous supernatant solution. Examples of the mixture of higher α-olefins having 18 or more carbon atoms include Linearene 2024 (a trade name, produced by Idemitsu Kosan Co., Ltd., a mixture of α-olefins having from 18 to 26 carbon atoms).

Examples of the hydrocarbon solvent that can be used herein include an aromatic hydrocarbon solvent, such as benzene, toluene, xylene, ethylbenzene and the like, an alicyclic hydrocarbon solvent, such as cyclopentane, cyclohexane, methylcyclohexane and the like, an aliphatic hydrocarbon solvent, such as pentane, hexane, heptane, octane and the like, a halogenated hydrocarbon solvent, such as chloroform, dichloromethane and the like, and the like. The solvents may be used solely or as a combination of two or more of them.

The highly crystalline higher α-olefin polymer of the present invention necessarily satisfies the following requirements (1) and (2), and preferably satisfies the following requirements (1) to (4).

(1) The melting point (Tm), which is observed, by using a differential scanning calorimeter (DSC), from a melting endothermic curve obtained by maintaining a specimen at 190° C. for 5 minutes under a nitrogen atmosphere, cooling the specimen to −10° C. at a rate of 5° C./min, maintaining at −10° C. for 5 minutes, and then elevating a temperature thereof to 190° C. at a rate of 10° C./min, is from 55 to 100° C.

(2) Standards weight average molecular weight (Mw) measured by a gel permeation chromatography (GPC) based on polystyrene is from 1,000 to 5,000,000, and the molecular weight distribution (Mw/Mn) measured thereby is 5.0 or less.

(3) The stereoregularity index M2 derived from a chain of the higher α-olefin having from 22 to 40 carbon atoms is 50% by mol or more.

(4) A single peak X1 is observed that is derived from crystallization of a side chain observed at 15 deg<2θ<30 deg in a wide angle X-ray scattering intensity distribution.

In the item (1), the higher α-olefin polymer of the present invention necessarily has a melting point (Tm) of from 55 to 100° C., preferably from 55 to 80° C., and more preferably from 60 to 80° C. In the case where the melting point (Tm) is in the range of from 55 to 100° C., the higher α-olefin polymer is difficult to suffer tackiness even under the industrial use conditions, and thus is excellent in heat resistance and also is excellent in working property since it is melted homogeneously at a certain temperature.

The half value width (Wm) defined as follows is preferably 10° C. or less, more preferably 7° C. or less, and further preferably from 2 to 5° C. The half value width (Wm) means a peak width of a melting endothermic peak on measuring the melting point (Tm) in the item (1) at a height of a midpoint between the base line and the peak top of the entire melting endothermic peak. In the case where the half value width (Wm) is 10° C. or less, homogeneous crystals are formed in the highly crystalline higher α-olefin polymer, and the polymer becomes homogeneous. In the case where the half value width is 10° C. or less, a sharp melting behavior is exhibited, and in the case where the polymer is used as a main material of a temperature-sensitive tackiness agent for example, a narrow switching temperature range between tackiness and non-tackiness is obtained to attain rapid change in tackiness force depending on temperature. In other words, favorable temperature sensitivity can be obtained.

The melting heat (ΔH) of the highly crystalline higher α-olefin polymer calculated from the area of the melting peak obtained upon measuring the melting point (Tm) is generally 30 J/g or more, preferably 50 J/g or more, more preferably 60 J/g or more, and further preferably 75 J/g or more. In the case where ΔH is 30 J/g or more, the polymer has high crystallinity, whereby high hardness and favorable melting property are obtained.

In the item (2), the higher α-olefin polymer of the present invention necessarily has a standards weight average molecular weight (Mw) measured by a gel permeation chromatography (GPC) based on polystyrene of from 1,000 to 5,000,000, and preferably from 10,000 to 1,000,000. In the case where Mw is 1,000 or more, the higher α-olefin polymer is improved in strength, and in the case where Mw is 5,000,000 or less, mixing and molding thereof can be easily carried out.

The higher α-olefin polymer of the present invention necessarily has a molecular weight distribution (Mw/Mn) measured by a GPC method of 5.0 or less, more preferably from 1.5 to 3.5, and further preferably 1.5 to 3.0. In the case where the molecular weight distribution (Mw/Mn) is 5.0 or less, the compositional distribution is appropriate but is not too broad, and thus deterioration in surface property, such as tackiness, and reduction in strength can be prevented from occurring.

The weight average molecular weight (Mw) herein is a polystyrene-reduced value measured by a GPC method with the following equipment under the following conditions, and the molecular weight distribution (Mw/Mn) is a value calculated from a number average molecular weight (Mn) measured as similar to the weight average molecular weight (Mw).

GPC Measurement Equipment:
Detector: RI detector for liquid chromatogram WATERS 15° C.
Column: TOSO GMHHR-H(S)HT
Measurement Conditions:
Solvent: 1,2,4-trichlorobenzene
Measurement temperature: 145° C.
Flow rate: 1.0 mL/min
Concentration of specimen: 2.2 mg/mL
Injection amount: 160 μL
Calibration line: Universal Calibration
Analysis program: HT-GPC (ver. 1.0)

The item (3) shows that the higher α-olefin polymer of the present invention preferably has an isotactic structure. The stereoregularity index M2 is preferably 50% by mol or more, more preferably from 50 to 90% by mol, further preferably from 55 to 85% by mol, and particularly preferably from 55 to 75% by mol. In the case where the stereoregularity index M2 is 50% by mol or more, an atactic structure and a syndiotactic structure are prevented from occurring, and thus high crystallinity is obtained by suppressing amorphous nature, whereby deterioration in surface property, such as tackiness, and reduction in strength can be prevented from occurring.

The stereoregularity index M2 is obtained according to the method proposed in Macromolecules, 24, 2334 (1991) by T. Asakura, M. Demura and Y. Nishiyama. Specifically, it can be obtained by utilizing the phenomenon in that the $CH_2$ carbon at the α-position of the side chain derived from the higher α-olefin observed in a $^{13}C$-NMR spectrum is split corresponding to the difference in stereoregularity. A larger value of M2 shows higher isotacticity.

The measurement of $^{13}C$-NMR is carried out with the following equipment under the following conditions.
Equipment: $^{13}C$-NMR Equipment Model NM-EX400, produced by JEOL Ltd.
Method: proton complete decoupling method
Concentration: 220 mg/mL
Solvent: mixed solvent of 1,2,4-trichlorobenzene and deuterated benzene (90/10 by volume)
Measurement temperature: 130° C.
Pulse width: 45°
Pulse repetition time: 4 seconds
Accumulation number: 1,000

The stereoregularity index M2 is calculated in the following manner. Six large absorption peak derived from the mixed solvent appear at from 127 to 135 ppm, and the peak value of the fourth peak from the low magnetic field side is designated as 131.1 ppm, which is used as the standard of chemical shift. The absorption peak derived from the $CH_2$ carbon at the α-position of the side chain is observed at from 34 to 37 ppm. Herein, M2 is obtained by the following expression.

$$M2=[(\text{integrated intensity at } 36.2\text{-}35.3 \text{ ppm})/(\text{integrated intensity at } 36.2\text{-}34.5 \text{ ppm})]\times 100$$

In the case of the item (4) where a single peak X1 derived from side chain crystals is observed in a wide angle X-ray scattering intensity distribution, a sharp melting peak is obtained, whereby a narrow distribution of crystal components is obtained to improve the strength and the secondary working property. The single peak X1 derived from crystallization of the side chain observed at 15 deg<2θ<30 deg in the wide angle X-ray scattering intensity distribution, and the intensity ratio (%) thereof are measured in the following manner.

A wide angle X-ray scattering (WAXS) intensity distribution is measured with a pair cathode type Rotaflex RU-200, produced by Rigaku Corp. by radiating a monochrome CuKa line (wavelength: 0.154 nm) having an output of 30 kV and 100 mA having been made into parallel beams with a pinhole of φ 1.5 mm and measuring the intensity distribution with a position-sensitive proportional counter tube at an exposure time of 1 minute to measure the single peak X1.

The highly crystalline higher α-olefin polymer of the present invention is preferably synthesized in the presence of a homogeneous catalyst system, which is referred to as a metallocene catalyst. As described, for example, in Japanese Patent Application Laid-Open (kokai) No. 2005-75908, the highly crystalline higher α-olefin polymer can be produced by using the metallocene catalyst described later, and in particular, an isotactic polymer can be produced thereby. A $C_2$-symmetric or $C_1$-symmetric transition metal compound is preferably used.

Specifically, this is such a method that a monomer containing 80% by mol or more of a higher α-olefin having from 22 to 40 carbon atoms is polymerized in the presence of a polymerization catalyst comprising (A) a double-crosslinked transition metal compound and (B) at least one component selected from (B-1) a compound capable of forming an ionic complex through reaction with the transition metal compound as the component (A) or a derivative thereof and (B-2) an aluminoxane, or in the presence of a preliminary polymerization catalyst comprising a polymerization catalyst comprising (A) a double-crosslinked transition metal compound, (B) at least one component selected from (B-1) a compound capable of forming an ionic complex through reaction with the transition metal compound as the component (A) or a derivative thereof and (B-2) an aluminoxane, and (C) an organoaluminum compound, having been made in contact with an α-olefin having from 3 to 18 carbon atoms in advance. In the present invention, the polymerization of the monomer is carried out in a homogeneous liquid state.

In the polymerization catalyst, the double-crosslinked transition metal compound as the component (A) is preferably a transition metal compound having a double-bridged biscyclopentadienyl derivative as a ligand and containing silicon in a bridging group between the ligands, and examples thereof include a disubstituted indenyl complex, such as (1,2'-dimethylsilylene)(2,1'-dimethylsilylene) bis(3-trimethylsilylmethylindenyl)zirconium dichloride and the like, a monosubstituted indenyl complex, such as (1,2'-dimethylsilylene)(2,1'-dimethylsilylene)(3-trimethylsilylmethylindenyl)(indenyl)zirconium dichloride and the like, and the like.

Examples of the component (B-1) include dimethylanilinium tetrakispentafluorophenylborate and the like. Examples of the component (B-2) include a linear aluminoxane, such as methylaluminoxane and the like, and a cyclic aluminoxane. As the component (C), an organoaluminum compound, such as trimethylaluminum, triisobutylaluminum and the like, may be used in addition to the component (A) and the component (B).

The components (A), (B) and (C) in the preliminary polymerization catalyst, ones that are the same as those exemplified for the polymerization catalyst may be used. Examples of the α-olefin having from 3 to 18 carbon atoms used for preparing the preliminary polymerization catalyst include propylene, 1-butene, 1-pentene, 1-hexene, 1-octene, 1-decene, 1-dodecene, 1-tetradecene, 1-hexadecene, 1-octadecene and the like.

The preliminary polymerization catalyst can be prepared by mixing the polymerization catalyst comprising the components (A) to (C) and the α-olefin having from 3 to 18 carbon atoms in a solvent, and stirring at generally from −20 to 200° C., preferably from −10 to 130° C., and more preferably from 0 to 80° C. In the preliminary polymerization, an aliphatic hydrocarbon, an aromatic hydrocarbon, a monomer and the like may be used as a solvent. Among these, an aromatic hydrocarbon is particularly preferred. The preliminary polymerization may be carried out without solvent.

The conditions for the preliminary polymerization are preferably controlled to a limiting viscosity (η) of the preliminary polymerization product (measured in decalin at 135° C.) of 0.1 dL/g or more and an amount of the preliminary polymerization catalyst of from 1 to 10,000 g, and particularly from 10 to 1,000 g, per 1 mmol of the transition metal component in the catalyst.

In the present invention, the monomer is polymerized in a homogeneous liquid state. For carrying out the polymerization in a homogeneous liquid state, polymerization may be carried out in a solvent, or bulk polymerization may be carried out at a temperature of 55° C. or more (the upper limit of which is about 250° C.). Examples of the solvent that can be used herein include an aromatic hydrocarbon solvent, such as benzene, toluene, xylene, ethylbenzene and the like, an alicyclic hydrocarbon solvent, such as cyclopentane, cyclohexane, methylcyclohexane and the like, an aliphatic hydrocarbon solvent, such as pentane, hexane, heptane, octane and the like, a halogenated hydrocarbon solvent, such as chloroform, dichloromethane and the like, and the like. The solvents may be used solely or as a combination of two or more of them. A monomer, such as an α-olefin and the like, may be used as the solvent.

As the polymerization conditions, the polymerization temperature is generally about from −100 to 250° C., preferably from −50 to 200° C., and more preferably from 0 to 180° C. The polymerization time is generally about from 5 minutes to 10 hours, and the reaction pressure is preferably from ordinary pressure to 20 MPa (gauge), and more preferably from ordinary pressure to 10 MPa (gauge).

In the process for production of a highly crystalline higher α-olefin polymer of the present invention, hydrogen is preferably added since the polymerization activity is improved. In the case where hydrogen is used, the pressure thereof is generally about from ordinary pressure to 5 MPa (gauge) preferably from ordinary pressure to 3 MPa (gauge), and more preferably from ordinary pressure to 2 MPa (gauge).

Examples of the method for controlling the molecular weight of the polymer include selection of the kinds and use amounts of the catalyst components, polymerization in the presence of hydrogen, and the like. An inert gas, such as nitrogen, may also be used.

In the present invention, the higher α-olefin polymer thus produced in the aforementioned manner is preferably purified. Specifically, such a method or the like may be employed in that a polymer is crystallized and deposited at a temperature equal to or lower than the polymerization temperature from a solution containing the polymer obtained by polymerizing the monomer in a homogeneous liquid state, filtered and rinsed.

The highly crystalline higher α-olefin polymer of the present invention is particularly useful as a releasing agent for a toner and a component for ink. In the case where the polymer is used as a releasing agent for a toner, the highly crystalline higher α-olefin polymer of the present invention is mixed with an acrylate resin and a polyester resin as a major resin and a subsidiary resin, a pigment, a charge controlling agent and an additive.

In addition to a releasing agent for a toner and a component for ink, the polymer is also useful as components of a modifier for a resin, a component for a tackiness agent, a component for an adhesive, a component of a lubricant oil, an organic or inorganic composite material, a heat storage material, a modifier for a fuel oil, such as a light fuel oil, a modifier for asphalt, high performance wax, cosmetics (such as lipstick, hair oil, creme, eyebrow pencil, eye shadow, brilliantine, facial mask, hair shampoo and hair conditioner), a medical material (such as ointment, suppository, emulsion, surgical bandage and wet compress), stationery (crayon, pastel crayon, pencil and carbon paper), a glazing agent (for wood, furniture, leather, automobile, paper, confectionery and fibers), a candle, creme for leather, textile oil, confectionery materials, model materials, sculpture materials, leather finishing materials, wax paper for an insulating material, a musical instrument, a printing material for a brazing material for tree grafting, a material for producing a casting mold, wax coating for fruits, various kinds of grease, ski wax, battik dyeing, a polishing agent, car wax, a metalworking fluid, an anti-aging agent for rubber, a tire, an adhesive, processed paper, a heat storage material, agrichemicals, fertilizer, an abrasive agent (for metals and stainless steel), an oily lubricant, grease, a releasing agent, a paint, dental wax, a fixing material (for a lens and embedding), and the like.

EXAMPLES

The present invention will be described in more detail with reference to examples, but the present invention is not limited by the examples.

Production Example 1

Preparation of Catalyst Component (1,2'-Dimethylsilylene)(2,1'-dimethylsilylene)bis(3-trimethylsilylmethylindenyl)zirconium dichloride was produced in the following manner.

2.5 g (7.2 mmol) of (1,2'-dimethylsilylene)(2,1'-dimetnylsilylene)bis(indene) and 100 mL of ether were placed in a Schlenk flask having an interior content of 200 mL under a nitrogen stream. After cooling to −78° C., 9.0 mL (14.8 mmol) of a hexane solution (1.6 mol/L) of n-butyllithium (n-BuLi) was added thereto, followed by stirring at room temperature for 12 hours. After distilling the solvent off, the resulting solid was washed with 20 mL of hexane and dried under reduced pressure to obtain quantitatively a lithium salt in the form of white solid.

The lithium salt of (1,2'-dimethylsilylene)(2,1'-dimethylsilylene)bis(indene) (6.97 mmol) was dissolved in 50 mL of THF (tetrahydrofuran) in the Schlenk flask, and 2.1 mL (14.2 mmol) of iodomethyltrimethylsilane was slowly added dropwise thereto at room temperature, followed by stirring for 12 hours. After distilling the solvent off, 50 mL of ether was added to the reaction solution, which was then washed with a saturated ammonium chloride solution.

After separating the liquids, the organic layer was dried, and the solvent was removed, so as to obtain 3.04 g (5.9 mmol) of (1,2'-dimethylsilylene)(2,1'-dimethylsilylene) bis (3-trimethylsilylmethylindene) (yield: 84%).

3.04 g (5.9 mmol) of (1,2'-dimethylsilylene)(2,1'-dimethylsilylene)bis(3-trimethylsilylmethylindene) obtained above and 50 mL of ether were placed in the Schlenk flask under a nitrogen stream. After cooling to −78° C., 7.4 mL (11.8 mmol) of a hexane solution (1.6 mol/L) of n-butyllithium (n-BuLi) was added thereto, followed by stirring at room temperature for 12 hours.

After distilling the solvent off, the resulting solid was washed with 40 mL of hexane to obtain 3.06 g of an ether-addition product of the lithium salt.

The product was measured for $^1$H-NMR, and the following results were obtained.

$^1$H-NMR (90 MHz, THF-d$_8$): δ 0.04 (s, —SiMe$_3$, 18H), 0.48 (s, -Me$_2$Si–, 12H), 1.10 (t, —CH$_3$, 6H), 2.59 (s, —CH$_2$—, 4H), 3.38 (q, —CH$_2$—, 4H), 6.2-7.7 (m, Ar—H, 8H)

3.06 g of the lithium salt obtained above was suspended in 50 mL of toluene under a nitrogen stream. After cooling to −78° C., a suspension liquid of 1.2 g (5.1 mmol) of zirconium tetrachloride in toluene (20 mL) having been cooled to −78° C. was added dropwise thereto. After completing the dropwise addition, the reaction mixture was stirred at room temperature for 6 hours.

After distilling the solvent off from the reaction solution, the resulting residue was recrystallized from dichloromethane to obtain 0.9 g (1.33 mmol) of (1,2'-dimethylsilylene)(2,1'-dimethylsilylene)bis(3-trimethylsilylmethylindenyl)zirconium dichloride in the form of yellow fine crystals (yield: 26%).

The product was measured for $^1$H-NMR, and the following results were obtained.

$^1$H-NMR (90 MHz, CDCl$_3$): δ 0.0 (S, —SiMe$_3$—, 18H), 1.02, 1.12 (s, -Me$_2$Si—, 12H), 2.51 (dd, —CH$^2$-, 4H), 7.1-7.6 (m, Ar—H, 8H)

Production Example 2

Preparation of Catalyst Component (1,2'-Dimethylsilylene)(2,1'-dimethylsilylene)(3-trimethylsilylmethylindenyl)(indenyl)zirconium dichloride was produced in the following manner.

3.5 g (10.2 mmol) of (1,2'-dimethylsilylene)(2,1'-dimethylsilylene)bisindene and 50 mL of ether were placed in a Schlenk flask having an interior content of 200 mL under a nitrogen stream. After cooling to −78° C., 12.8 mL of a hexane solution (1.60 mol/L) of n-butyllithium (n-BuLi) was added thereto, followed by stirring at room temperature for 8 hours. After distilling the solvent off, the resulting solid was dried under reduced pressure to obtain 5.0 g of white solid.

The solid was dissolved in 50 mL of tetrahydrofuran (THF), to which 1.4 mL of iodomethyltrimethylsilane was added dropwise at room temperature. The reaction product was hydrolyzed with 10 mL of water, and the organic layer was extracted with 50 mL of ether. The organic layer was then dried, and the solvent was distilled off. 50 mL of ether was added thereto, and 12.4 mL of a hexane solution (1.60 mmol/L) of n-BuLi was added dropwise thereto at −78° C. The reaction mixture was stirred at room temperature for 3 hours, and then ether was distilled off.

The resulting solid was washed with 30 mL of hexane and then dried under reduced pressure. 5.11 g of the white solid was suspended in 50 mL of toluene, to which 2.0 g (8.60 mmol) of zirconium tetrachloride having been suspended in 10 mL toluene in another Schlenk flask was added. After stirring at room temperature for 12 hours, the solvent was distilled off. The residue was washed with 50 mL of toluene and then recrystallized from 30 mL of dichloromethane to obtain 1.2 g of yellow fine crystals (yield: 25%).

The product was measured for $^1$H-NMR, and the following results were obtained.

$^1$H-NMR (90 MHz, CDCl$_3$) δ 0.09 (s, —SiMe$_3$—, 9H), 0.89, 0.86, 1.03, 1.06 (s, -Me$_2$Si—, 12H), 2.20, 2.65 (d, —CH$_2$—, 2H), 6.99 (s, CH, 1H), 7.0-7.8 (m, Ar—H, 8H)

Production Example 3

Preparation of Preliminary Polymerization Catalyst

20 μmol of the catalyst component obtained in Production Example 1, 40 μmol of dimethylanilinium borate, 0.2 mmol of triisobutylaluminum and 0.78 g of Linearene 18 (a trade name, produced by Idemitsu Kosan Co., Ltd., 1-octadecene) were mixed in 6.0 mL of toluene, followed by stirring at room temperature for 12 hours, to obtain a preliminary polymerization catalyst.

Production Example 4

Preparation of Monomer 1

Linearene 26+ (a trade name, produced by Idemitsu Kosan Co., Ltd., a mixture mainly of α-olefins having 26 or more carbon atoms) was distilled under reduced pressure (0.093 to 0.20 kPa), and a monomer 1 was obtained as a fraction at a distillation temperature of from 190 to 250° C. The compositional ratio of the fraction was C24 (number of carbon atoms, hereinafter the same): 30.3% by mass (32.8% by mol), C26: 42.6% by mass (42.6% by mol), C28: 18.9% by mass (17.5% by mol), and C30 or higher: 8.2% by mass (7.1% by mol). Accordingly, the content of α-olefins having 22 or more carbon atoms was 100.0% by mass (100.0% by mol). 50 g of the monomer 1 and 200 mL of toluene were placed in a Schlenk flask having an interior content of 500 mL, which had been dried by heating, in a nitrogen atmosphere, and after dehydrating with dry nitrogen and activated alumina, a homogeneous supernatant solution was extracted at room temperature (25° C.) to obtain a toluene solution of the monomer 1 (concentration: 23% by mass).

Production Example 5

Preparation of Monomer 2

Linearene 26+ (a trade name, produced by Idemitsu Kosan Co., Ltd., a mixture mainly of α-olefins having 26 or more carbon atoms) was distilled under reduced pressure (0.80 to 2.67 kPa), and a monomer 2 was obtained as a fraction at a distillation temperature of from 240 to 300° C. The compositional ratio of the fraction was C24: 35.9% by mass (38.7% by mol), C26: 36.4% by mass (36.3% by mol), C28: 17.8% by mass (16.5% by mol), and C30 or higher: 9.8% by mass (8.4% by mol). Accordingly, the content of α-olefins having 22 or more carbon atoms was 99.9% by mass (99.9% by mol). 86 g of the monomer 2 and 100 mL of toluene were placed in a Schlenk flask having an interior content of 500 mL, which had been dried by heating, in a nitrogen atmosphere, and after dehydrating with dry nitrogen and activated alumina, a homogeneous supernatant solution was extracted at room temperature (25° C.) to obtain a toluene solution of the monomer 2 (concentration: 50% by mass).

Production Example 6

Preparation of Monomer 3

A component capable of being dissolved in heptane at 25° C. was extracted from Linearene 26+ (a trade name, produced by Idemitsu Kosan Co., Ltd., a mixture mainly of α-olefins having 26 or more carbon atoms) in a nitrogen atmosphere, and heptane was distilled off under reduced pressure from the extracted component to obtain a monomer 3. The compositional ratio of the monomer 3 was C24: 25.7% by mass (28.7% by mol), C26: 27.6% by mass (28.5% by mol), C28: 20.0% by mass (19.1% by mol), C30-C36: 23.7% by mass (21.2% by mol), and C38 or higher: 3.0% by mass (2.5% by mol). Accordingly, the content of α-olefins having 22 or more carbon atoms was 100.0% by mass (100.0% by mol). Toluene was again added to the monomer 3 in a nitrogen atmosphere to provide a toluene solution, which was dehydrated with dry nitrogen and activated alumina, and a homogeneous supernatant solution was extracted at room temperature (25° C.) to obtain a toluene solution of the monomer 3 (concentration: 43% by mass).

Production Example 7

Preparation of Monomer 4

Linearene 2024 (a trade name, produced by Idemitsu kosan Co., Ltd., a mixture mainly of α-olefins having from 18 to 26 carbon atoms) was distilled under reduced pressure (0.27 to 2.00 kPa), and a monomer 4 was obtained as a fraction at a distillation temperature of from 180 to 220° C. The compositional ratio of the fraction was C20: 0.5% by mass (0.6% by mol), C22: 66.0% by mass (67.8% by mol), C24: 32.5% by mass (30.7% by mol), and C26: 1.0% by mass (0.9% by mol). Accordingly, the content of α-olefins having 22 or more carbon atoms was 99.5% by mass (99.4% by mol). 350 mL of the monomer 4 and 150 mL of heptane were placed in a Schlenk flask having an interior content of 500 mL, which had been dried by heating, in a nitrogen atmosphere, and after dehydrating with dry nitrogen and activated alumina, a homogeneous supernatant solution was extracted at room temperature (25° C.) to obtain a heptane solution of the monomer 4 (concentration: 70% by mass).

Production Example 8

Preparation of Monomer 5

Linearene 26+ (a trade name, produced by Idemitsu Kosan Co., Ltd., a mixture mainly of α-olefins having 26 or more carbon atoms) was distilled under reduced pressure (0.0067 to 0.13 kPa), and a monomer 5 was obtained as a fraction at a distillation temperature of from 200 to 300° C. The compositional ratio of the fraction was C24: 1.2% by mass (1.3% by mol), C26: 56.8% by mass (58.7% by mol), C28: 39.4% by mass (37.7% by mol), and C30: 2.6% by mass (2.3% by mol). Accordingly, the content of α-olefins having 22 or more carbon atoms was 100.0% by mass (100.0% by mol). 86 g of the monomer 5 and 100 mL of toluene were placed in a Schlenk flask having an interior content of 500 mL, which had been dried by heating, in a nitrogen atmosphere, and after dehydrating with dry nitrogen and activated alumina, a homogeneous supernatant solution was extracted at room temperature (25° C.) to obtain a toluene solution of the monomer 5 (concentration: 50% by mass).

The compositional ratios of the monomers 1 to 5, and Linearene 26+ and Linearene 2024 as raw materials are shown in Table 1. In Table 1, the unit for the compositional ratios and the amounts of the components are percent by mol.

TABLE 1

|  | C18 | C20 | C22 | C24 | C26 | C28 | C30 | C32 | C34 | C36 | C38-C40 | C42 or higher | Amount of C22-40 components |
|---|---|---|---|---|---|---|---|---|---|---|---|---|---|
| Linearene 25+ | — | — | 0 | 21.6 | 21.4 | 14.4 | 9.7 | 6.3 | 4.1 | 2.9 | 3.9 | 15.7 | 84.3 |
| Monomer 1 | — | — | 0 | 32.8 | 42.6 | 17.5 | 7.1 | — | — | — | — | — | 100.0 |
| Monomer 2 | — | — | 0 | 38.7 | 36.3 | 16.5 | 8.4 | — | — | — | — | — | 99.9 |
| Monomer 3 | — | — | 0 | 28.7 | 28.5 | 19.1 | | 21.2 | | | 2.5 | — | 100.0 |
| Monomer 5 | — | — | 0 | 1.3 | 58.7 | 37.7 | 2.3 | — | — | — | — | — | 100.0 |
| Linearene 2024 | 5.9 | 42.5 | 34.8 | 15.9 | 0.8 | — | — | — | — | — | — | — | 51.5 |
| Monomer 4 | 0 | 0.6 | 67.8 | 30.7 | 0.9 | — | — | — | — | — | — | — | 99.4 |

Production Example 9

Preparation of Monomers 6 and 7

The monomer 4 obtained in Production Example 7 was distilled under reduced pressure (0.10 to 2.00 kpa) at 200 to 280° C. to obtain monomers 6 and 7. The compositional ratio of the fraction of the monomer 6 was C20: 0.4% by mass (0.4% by mol), C22: 99.3% by mass (99.3% by mol), and C24: 0.3% by mass (0.3% by mol). The compositional ratio of the fraction of the monomer 7 was C22: 0.5% by mass (0.5% by mol) and C24: 99.5% by mass (99.5% by mol). Accordingly, the contents of α-olefins having 22 or more carbon atoms of the monomers 6 and 7 were 99.5% by mass (99.5% by mol) or more. 500 mL of the monomer 6 was placed in a Schlenk flask having an interior content of 500 mL, which had been dried by heating, in a nitrogen atmosphere, and after dehydrating with dry nitrogen and activated alumina, a homogeneous supernatant solution was extracted at room temperature (25° C.) to obtain a purified product of the monomer 6 (concentration: 100% by mass). The monomer 7 was processed in the same manner as above.

Example 1

50 mL of the toluene solution of the monomer 1 (concentration: 23% by mass) obtained in Production Example 4 was placed in a Schlenk flask having an interior content of 200 mL, which had been dried by heating, and was confirmed as to be a homogeneous solution at a polymerization temperature of 25° C. 0.5 mmol of triisobutylaluminum, 2 μmol of (1,2'-dimethylsilylene)(2,1'-dimethylsilylene)bis(3-trimethylsilylmethylindenyl)zirconium dichloride prepared in Production Example 1 and 8 μmol of dimethylanilinium tetrakispentafluorophenylborate were added thereto, and the mixture was polymerized at room temperature for 180 minutes. After completing the polymerization reaction, the reaction product thus precipitated was separated at room temperature (25° C.), and after washing with toluene and acetone, it was dried by heating under reduced pressure to obtain 40 g of a highly crystalline higher α-olefin copolymer.

The resulting highly crystalline higher α-olefin copolymer was measured for properties by the following manners. The results are shown in Table 2.

(1) Melting Point (Tm), Melting Heat (ΔH) and Half Value Width (Wm)

These were measured with a differential scanning calorimeter (DSC7, produced by Perkin-Elmer, Inc.) according to the method described above.

(2) Weight Average Molecular Weight (Mw) and Molecular Weight Distribution (Mw/Mn)

A average molecular weight (Mw) and a number average molecular weight (Mn) were measured by a gel permeation chromatography (GPC) method according to the above, and a molecular weight distribution (Mw/Mn) was obtained.

(3) Stereoregularity Index M2

It was obtained according to the method proposed in Macromolecules, 24, 2334 (1991) by T. Asakura, M. Demura and Y. Nishiyama, as described above.

(4) Single Peak X1

It was measured with a pair cathode type Rotaflex RU-200, produced by Rigaku Corp. according to the method described above.

Example 2

50 mL of the toluene solution of the monomer 2 (concentration: 50% by mass) obtained in Production Example 5 was placed in a Schlenk flask having an interior content of 200 mL, which had been dried by heating, and was confirmed as to be a homogeneous solution at 25° C. 0.5 mmol of triisobutylaluminum, 2 μmol of (1,2'-dimethylsilylene)(2,1'-dimethylsilylene)bis(3-trimethylsilylmethylindenyl)zirconium dichloride prepared in Production Example 1 and 8 μmol of dimethylanilinium tetrakispentafluorophenylborate were added thereto, and the mixture was polymerized at a polymerization temperature of 50° C. for 180 minutes. After completing the polymerization reaction, the reaction product thus precipitated was separated at room temperature (25° C.), and after washing with toluene and acetone, it was dried by heating under reduced pressure to obtain 36.6 g of a highly crystalline higher α-olefin copolymer.

The resulting highly crystalline higher α-olefin copolymer was measured for properties by the aforementioned manners. The results are shown in Table 2.

Example 3

50 mL of the toluene solution of the monomer 3 (concentration: 43% by mass) obtained in Production Example 6 was placed in a Schlenk flask having an interior content of 200 mL, which had been dried by heating, and was confirmed as to be a homogeneous solution at a polymerization temperature of 25° C. 2 mmol of triisobutylaluminum, 2 μmol of (1,2'-dimethylsilylene)(2,1'-dimethylsilylene)bis(3-trimethylsilylmethylindenyl)zirconium dichloride prepared in Production Example 1 and 4 μmol of dimethylanilinium tetrakispentafluorophenylborate were added thereto, and the mixture was polymerized at room temperature for 180 minutes. After completing the polymerization reaction, the reaction product thus precipitated was separated, and after washing with heptane, it was dried by heating under reduced pressure to obtain 2.1 g of a highly crystalline higher α-olefin copolymer.

The resulting highly crystalline higher α-olefin copolymer was measured for properties by the aforementioned manners. The results are shown in Table 2.

Example 4

400 mL of the toluene solution of the monomer 2 (concentration: 50% by mass) obtained in Production Example 5 was placed in an autoclave having an interior content of 1 L, which had been dried by heating, and was confirmed as to be a homogeneous solution at 25° C. 2 mmol of triisobutylaluminum and 4 µmol of the preliminary polymerization catalyst prepared in Production Example 3 were added thereto, hydrogen was further added thereto at 60° C. to 0.05 MPa, and the mixture was then polymerized for 300 minutes. After completing the polymerization reaction, the reaction product thus precipitated was separated, and after washing with heptane, it was dried by heating under reduced pressure to obtain 83.2 g of a highly crystalline higher α-olefin copolymer.

The resulting highly crystalline higher α-olefin copolymer was measured for properties by the aforementioned manners. The results are shown in Table 2.

Example 5

100 mL of the toluene solution of the monomer 4 (concentration: 70% by mass) obtained in Production Example 7 was placed in a Schlenk flask having an interior content of 200 mL, which had been dried by heating, and was confirmed as to be a homogeneous solution at a polymerization temperature of 25° C. 2 mmol of triisobutylaluminum, 2 µmol of (1,2'-dimethylsilylene)(2,1'-dimethylsilylene)bis(3-trimethylsilylmethylindenyl)zirconium dichloride prepared in Production Example 1 and 4 µmol of dimethylanilinium tetrakispentafluorophenylborate were added thereto, and the mixture was polymerized at room temperature for 420 minutes. After completing the polymerization reaction, the reaction product thus precipitated was separated, and after washing with heptane, it was dried by heating under reduced pressure to obtain 44.8 g of a highly crystalline higher α-olefin copolymer.

The resulting highly crystalline higher α-olefin copolymer was measured for properties by the aforementioned manners. The results are shown in Table 2.

Example 6

400 mL of the toluene solution of the monomer 4 (concentration: 70% by mass) obtained in Production Example 7 was placed in an autoclave having an interior content of 1 L, which had been dried by heating, and was confirmed as to be a homogeneous solution at 25° C. 0.5 mmol of triisobutylaluminum, 2 µmol of (1,2'-dimethylsilylene)(2,1'-dimethylsilylene)(3-trimethylsilylmethylindenyl)(indenyl)zirconium dichloride prepared in Production Example 2 and 8 µmol of dimethylanilinium tetrakispentafluorophenylborate were added thereto, hydrogen was further added thereto at a polymerization temperature of 60° C. to 0.03 MPa, and the mixture was then polymerized for 180 minutes. After completing the polymerization reaction, the reaction product thus precipitated was separated at room temperature (25° C.), and after washing with toluene and acetone, it was dried by heating under reduced pressure to obtain 156.8 g of a highly crystalline higher α-olefin copolymer.

The resulting highly crystalline higher α-olefin copolymer was measured for properties by the aforementioned manners. The results are shown in Table 2.

Example 7

300 mL of the toluene solution of the monomer 4 (concentration: 70% by mass) obtained in Production Example 7 and 49 mL of Linearene 18 (a trade name, produced by Idemitsu Kosan Co., Ltd., 1-octadecene) were placed in an autoclave having an interior content of 1 L, which had been dried by heating, and were confirmed as to be a homogeneous solution at 25° C. 0.5 mmol of triisobutylaluminum, 2 µmol of (1,2'-dimethylsilylene)(2,1'-dimethylsilylene)(3-trimethylsilylmethylindenyl)(indenyl)zirconium dichloride prepared in Production Example 2 and 8 µmol of dimethylanilinium tetrakispentafluorophenylborate were added thereto, hydrogen was further added thereto at a polymerization temperature of 60° C. to 0.03 MPa, and the mixture was then polymerized for 180 minutes. After completing the polymerization reaction, the reaction product thus precipitated was Separated at room temperature (25° C.), and after washing with toluene and acetone, it Was dried by heating under reduced pressure to obtain 156.8 g of a highly crystalline higher α-olefin copolymer.

The resulting highly crystalline higher α-olefin copolymer was measured for properties by the aforementioned manners. The results are shown in Table 2.

Example 8

200 mL of the toluene solution of the monomer 5 (concentration: 50% by mass) obtained in Production Example 8 was placed in an autoclave having an interior content of 1 L, which had been dried by heating, and was confirmed as to be a homogeneous solution at 25° C. 0.5 mmol of triisobutylaluminum, 2 µmol of (1,2'-dimethylsilylene)(2,1'-dimethylsilylene)bis(3-trimethylsilylmethylindenyl)zirconium dichloride prepared in Production Example 1 and 8 µmol of dimethylanilinium tetrakispentafluorophenylborate were added thereto, hydrogen was further added thereto at a polymerization temperature of 85° C. to 0.15 MPa, and the mixture was then polymerized for 60 minutes. After completing the polymerization reaction, the reaction product thus precipitated was separated at room temperature (25° C.), and after washing with toluene and acetone, it was dried by heating under reduced pressure to obtain 58.8 g of a highly crystalline higher α-olefin copolymer.

The resulting highly crystalline higher α-olefin copolymer was measured for properties by the aforementioned manners. The results are shown in Table 2.

Example 9

400 mL of the monomer 4 obtained in Production Example 7 was placed in an autoclave having an interior content of 1 L, which had been dried by heating and then heated to 60° C., and was confirmed as to be a homogeneous solution at a polymerization temperature of 85° C. 0.5 mmol of triisobutylaluminum, 2 µmol of (1,2'-dimethylsilylene)(2,1'-dimethylsilylene)bis(3-trimethylsilylmethylindenyl)zirconium dichloride prepared in Production Example 1 and 8 µmol of dimethylanilinium tetrakispentafluorophenylborate were added thereto, hydrogen was further added thereto at 85° C. to 0.15 MPa, and the mixture was then polymerized for 120 minutes. After completing the polymerization reaction, the reaction product thus precipitated was separated, and after washing with toluene and acetone, it was dried by heating under reduced pressure to obtain 122.7 g of a highly crystalline higher α-olefin copolymer.

The resulting highly crystalline higher α-olefin copolymer was measured for properties by the aforementioned manners. The results are shown in Table 2.

Example 10

200 mL of the monomer 6 obtained in Production Example 9 was placed in an autoclave having an interior content of 1 L, which had been dried by heating, and was confirmed as to be a homogeneous solution at a polymerization temperature of 90° C. 0.5 mmol of triisobutylaluminum, 2 μmol of (1,2'-dimethylsilylene)(2,1'-dimethylsilylene)bis(3-trimethylsilylmethylindenyl)zirconium dichloride prepared in Production Example 1 and 4 μmol of dimethylanilinium tetrakispentafluorophenylborate were added thereto, and the mixture was polymerized at 90° C. for 120 minutes. After completing the polymerization reaction, the reaction product thus precipitated was separated, and after washing with heptane and methyl ethyl ketone, it was dried by heating under reduced pressure to obtain 118.2 g of a highly crystalline higher α-olefin copolymer.

The resulting highly crystalline higher α-olefin copolymer was measured for properties by the aforementioned manners. The results are shown in Table 2.

Example 11

200 mL of the monomer 7 obtained in Production Example 9 was placed in an autoclave having an interior content of 1 L, which had been dried by heating, and was confirmed as to be a homogeneous solution at a polymerization temperature of 90° C. 0.5 mmol of triisobutylaluminum, 2 μmol of (1,2'-dimethylsilylene)(2,1'-dimethylsilylene)bis(3-trimethylsilylmethylindenyl)zirconium dichloride prepared in Production Example 1 and 4 μmol of dimethylanilinium tetrakispentafluorophenylborate were added thereto, and the mixture was polymerized at 90° C. for 120 minutes. After completing the polymerization reaction, the reaction product thus precipitated was separated, and after washing with heptane and methyl ethyl ketone, it was dried by heating under reduced pressure to obtain 98.5 g of a highly crystalline higher α-olefin copolymer.

The resulting highly crystalline higher α-olefin copolymer was measured for properties by the aforementioned manners. The results are shown in Table 2.

Comparative Example 1

200 mL of the toluene solution of the monomer 4 (70% by mass) obtained in Production Example 7 and 60 mL of Linearene 18 (a trade name, produced by Idemitsu Kosan Co., Ltd., 1-octadecene) were placed in an autoclave having an interior content of 1 L, which had been dried by heating, and were confirmed as to be a homogeneous solution at 25° C. 0.5 mmol of triisobutylaluminum, 2 μmol of (1,2'-dimethylsilylene)(2,1'-dimethylsilylene)(3-trimethylsilylmethylindenyl)(indenyl)zirconium dichloride prepared in Production Example 2 and 8 μmol of dimethylanilinium tetrakispentafluorophenylborate were added thereto, hydrogen was further added thereto at a polymerization temperature of 60° C. to 0.03 MPa, and the mixture was then polymerized for 180 minutes. After completing the polymerization reaction, the reaction product thus precipitated was separated at room temperature (25° C.), and after washing with toluene and acetone, it was dried by heating under reduced pressure to obtain 156.8 g of a highly crystalline higher α-olefin copolymer.

The resulting highly crystalline higher α-olefin copolymer was measured for properties by the aforementioned manners. The results are shown in Table 2.

Reference Example 1

(1) Treatment of Monomer

A toluene solution of Linearene 26+ (a trade name, produced by Idemitsu Kosan Co., Ltd., a mixture mainly of α-olefins having 26 or more carbon atoms) was prepared and was dehydrated with dry nitrogen and activated alumina to obtain an inhomogeneous toluene solution of the monomer (concentration: 25% by mass).

(2) Polymerization 50 mL of the toluene solution of the monomer was placed in a Schlenk flask having an interior content of 200 mL, which had been dried by heating, and was confirmed as to be an inhomogeneous solution at a polymerization temperature of 50° C. 2 mmol of triisobutylaluminum, 2 μmol of (1,2'-dimethylsilylene)(2,1'-dimethylsilylene)bis(3-trimethylsilylmethylindenyl)zirconium dichloride prepared in Production Example 1 and 4 μmol of dimethylanilinium tetrakispentafluorophenylborate were added thereto, and the mixture was polymerized for 60 minutes. After completing the polymerization reaction, the reaction product thus precipitated was separated, and after washing with heptane, it was dried by heating under reduced pressure to obtain 10.3 g of a copolymer.

The resulting copolymer was measured for properties by the aforementioned manners. The results are shown in Table 2. The resulting residual component was analyzed. As a result, the melting peak on DSC was broad, and only melting points derived from the monomers were observed at 30.9° C. and 50.6° C. These were the same as the peaks derived from the monomers, and a melting point derived from a highly crystalline higher α-olefin copolymer having a melting point of 55° C. or more was not observed.

TABLE 2-1

|  | Example | | | | | | |
| --- | --- | --- | --- | --- | --- | --- | --- |
|  | 1 | 2 | 3 | 4 | 5 | 6 | 7 |
| Amount of C22-40 components in monomer (% by mol) | 100.0 | 99.9 | 100.0 | 99.9 | 99.4 | 99.4 | 80.5 |

TABLE 2-1-continued

| | Example | | | | | | |
|---|---|---|---|---|---|---|---|
| | 1 | 2 | 3 | 4 | 5 | 6 | 7 |
| Tm (° C.) | 65.3 | 67 | 63.1 | 67.2 | 64.3 | 64.7 | 55.3 |
| ΔH (J/g) | 115.9 | 115.1 | 125.3 | 115.4 | 100.7 | 100.9 | 100.9 |
| Half value width (Wm) | 2.8 | 3.4 | 5.7 | 3.3 | 3.2 | 3.3 | 3.1 |
| Mw | 318,000 | 366,000 | 25,000 | 35,000 | 510,000 | 490,000 | 46,000 |
| Mw/Mn | 1.83 | 1.77 | 1.45 | 1.78 | 2.48 | 2.25 | 2.31 |
| M2 | 55 | 55.6 | 55.3 | 55.4 | 55.6 | 65.2 | 55.4 |
| X1 | 21.4 | 21.2 | 21.2 | 21.3 | 21.3 | 21.2 | 21.2 |

TABLE 2-2

| | Example | | | | Comparative Example 1 | Reference Example 1 |
|---|---|---|---|---|---|---|
| | 8 | 9 | 10 | 11 | | |
| Amount of C22-40 components in monomer (% by mol) | 100.0 | 99.4 | 99.6 | 100.0 | 70.0 | 79.0 |
| Tm (° C.) | 71.1 | 61.9 | 62.4 | 65.1 | 49.1 | 32.9 50.6 |
| ΔH (J/g) | 130.4 | 113.4 | 102.3 | 117.7 | 93.2 | 160.3 |
| Half value width (Wm) | 3.4 | 3.1 | 3.3 | 3.2 | 2.8 | 5.8 5.1 |
| Mw | 31,000 | 52,000 | 28,000 | 27,000 | 48,000 | 1,400 |
| Mw/Mn | 1.47 | 1.69 | 1.98 | 1.91 | 2.21 | 1.07 |
| M2 | 55.6 | 55.4 | 55.6 | 55.5 | 55.3 | — |
| X1 | 21.4 | 21.2 | 21.3 | 21.3 | 21.4 | 20.5 23.8 |

INDUSTRIAL APPLICABILITY

The highly crystalline higher α-olefin polymer of the present invention is useful for such purposes as a releasing agent for a toner, a component for ink, a modifier for a resin, a component for a tackiness agent, a component for an adhesive, a component of a lubricant oil, an organic or inorganic composite material, a heat storage material, a modifier for a fuel oil, such as a light fuel oil, a modifier for asphalt, high performance wax and the like, and is particularly useful as a releasing agent for a toner and a component for ink.

The invention claimed is:

1. A process for production of a highly crystalline α-olefin polymer, the process comprising:
either 1) or 2),
1) dissolving a mixture of α-olefins having at least 18 carbon atoms in a hydrocarbon solvent at a temperature of 50° C. or less and then extracting a homogeneous supernatant solution from said mixture, or
2) distilling a mixture of α-olefins having at least 18 carbon atoms,
to obtain a monomer comprising 80% by mol or more of an α-olefin having from 22 to 40 carbon atoms; and
polymerizing the obtained monomer in a homogeneous liquid state in the presence of a polymerization catalyst comprising (A) a double-crosslinked transition metal compound and (B) at least one component selected from (B-1) a compound capable of forming an ionic complex through reaction with the transition metal compound as the component (A) or a derivative thereof and (B-2) an aluminoxane.

2. A process for production of a highly crystalline α-olefin polymer, the process comprising:
either 1) or 2),
1) dissolving a mixture of α-olefins having at least 18 carbon atoms in a hydrocarbon solvent at a temperature of 50° C. or less and then extracting a homogeneous supernatant solution from said mixture, or
2) distilling a mixture of α-olefins having at least 18 carbon atoms,
to obtain a monomer comprising 80% by mol or more of an α-olefin having from 22 to 40 carbon atoms; and
polymerizing the obtained monomer in a homogeneous liquid state in the presence of a preliminary polymerization catalyst comprising a polymerization catalyst comprising (A) a double-crosslinked transition metal compound, (B) at least one component selected from (B-1) a compound capable of forming an ionic complex through reaction with the transition metal compound as the component (A) or a derivative thereof and (B-2) an aluminoxane, and (C) an organoaluminum compound, having been made in contact with an α-olefin having from 3 to 18 carbon atoms in advance.

3. The process for production of a highly crystalline α-olefin polymer according to claim 1, wherein a polymer is crystallized and deposited at a temperature equal to or lower than the polymerization temperature from a solution containing a polymer obtained by polymerizing the monomer comprising 80% by mol or more of an α-olefin having from 22 to 40 carbon atoms in a homogeneous liquid state, filtered and rinsed.

4. The process for production of a highly crystalline α-olefin polymer according to claim 1, wherein the double-crosslinked transition metal compound is a transition metal compound having a double bridged biscyclopentadienyl derivative as a ligand and comprising silicon in a bridging group between the ligands.

5. The process for production of a highly crystalline α-olefin polymer according to claim 2, wherein the double-crosslinked transition metal compound is a disubstituted indenyl complex or a monosubstituted indenyl complex or mixtures thereof.

6. The process for production of a highly crystalline α-olefin polymer according to claim 1, wherein the compound capable of forming an ionic complex through reaction with the transition metal compound is dimethylanilinium tetrakispentafluorophenylborate.

7. The process for production of a highly crystalline α-olefin polymer according to claim 1, wherein the aluminoxane is a linear aluminoxane or a cyclic aluminoxane, or mixtures thereof.

8. The process for production of a highly crystalline α-olefin polymer according to claim 2, wherein the organoaluminum compound is trimethylaluminum or triisobutylaluminum or mixtures thereof.

9. The process for production of a highly crystalline α-olefin polymer according to claim 1, wherein the polymerization is carried out in a temperature of from −100 to 250° C.

10. The process for production of a highly crystalline α-olefin polymer according to claim 1, further comprising adding hydrogen to said polymerizing.

11. The process for production of a highly crystalline α-olefin polymer according to claim 1, further comprising controlling the molecular weight of the polymerization by performing said polymerizing in the presence of nitrogen.

12. The process for production of a highly crystalline α-olefin polymer according to claim 1, further comprising purifying the polymer obtained.

13. The process for production of a highly crystalline α-olefin polymer according to claim 1, comprising dissolving a mixture of α-olefins having at least 18 carbon atoms in a hydrocarbon solvent at a temperature of 50° C. or less and then extracting a homogeneous supernatant solution from said mixture to obtain a monomer comprising 80% by mol or more of an α-olefin having from 22 to 40 carbon atoms.

14. The process for production of a highly crystalline α-olefin polymer according to claim 1, comprising distilling a mixture of α-olefins having at least 18 carbon atoms to obtain a monomer comprising 80% by mol or more of an α-olefin having from 22 to 40 carbon atoms.

15. The process for production of a highly crystalline α-olefin polymer according to claim 2, comprising dissolving a mixture of α-olefins having at least 18 carbon atoms in a hydrocarbon solvent at a temperature of 50° C. or less and then extracting a homogeneous supernatant solution from said mixture to obtain a monomer comprising 80% by mol or more of an α-olefin having from 22 to 40 carbon atoms.

16. The process for production of a highly crystalline α-olefin polymer according to claim 2, comprising distilling a mixture of α-olefins having at least 18 carbon atoms to obtain a monomer comprising 80% by mol or more of an α-olefin having from 22 to 40 carbon atoms.

17. The process for production of a highly crystalline α-olefin polymer according to claim 2, wherein a polymer is crystallized and deposited at a temperature equal to or lower than the polymerization temperature from a solution containing a polymer obtained by polymerizing the monomer comprising 80% by mol or more of an α-olefin having from 22 to 40 carbon atoms in a homogeneous liquid state, filtered and rinsed.

18. The process for production of a highly crystalline α-olefin polymer according to claim 2, wherein the double-crosslinked transition metal compound is a transition metal compound having a double bridged biscyclopentadienyl derivative as a ligand and comprising silicon in a bridging group between the ligands.

19. The process for production of a highly crystalline α-olefin polymer according to claim 18, wherein the double-crosslinked transition metal compound is a disubstituted indenyl complex or a monosubstituted indenyl complex or mixtures thereof.

20. The process for production of a highly crystalline α-olefin polymer according to claim 2, wherein the compound capable of forming an ionic complex through reaction with the transition metal compound is dimethylanilinium tetrakispentafluorophenylborate.

* * * * *